United States Patent
Voyer et al.

(10) Patent No.: US 8,498,616 B2
(45) Date of Patent: Jul. 30, 2013

(54) METHOD FOR ENABLING A BASE STATION TO CONNECT TO A WIRELESS TELECOMMUNICATION NETWORK

(75) Inventors: Nicolas Voyer, Rennes Cedex (FR); Eric Lavillonniere, Rennes Cedex (FR); Sophie Pautonnier-Perrot, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 1295 days.

(21) Appl. No.: 11/523,712

(22) Filed: Sep. 20, 2006

(65) Prior Publication Data
US 2007/0099598 A1    May 3, 2007

(30) Foreign Application Priority Data
Oct. 13, 2005    (EP) ..................... 05292161

(51) Int. Cl.
*H04W 12/06* (2009.01)
(52) U.S. Cl.
USPC .................. 455/411; 455/456.1; 455/436
(58) Field of Classification Search
USPC .............. 455/517, 524, 435.1, 561, 410–411, 455/429, 432.3, 433, 446, 456.1, 535.1, 560
See application file for complete search history.

(56) References Cited

U.S. PATENT DOCUMENTS

| | | | | |
|---|---|---|---|---|
| 5,751,813 A * | 5/1998 | Dorenbos | | 713/153 |
| 5,864,764 A * | 1/1999 | Thro et al. | | 455/561 |
| 6,292,891 B1 | 9/2001 | Bergenwall et al. | | |
| 6,907,243 B1 * | 6/2005 | Patel | | 455/442 |
| 7,035,637 B2 * | 4/2006 | Motegi et al. | | 455/435.1 |
| 7,302,256 B1 * | 11/2007 | O'Hara et al. | | 455/418 |
| 2002/0151308 A1 * | 10/2002 | Baba et al. | | 455/446 |
| 2003/0064752 A1 * | 4/2003 | Adachi et al. | | 455/560 |
| 2004/0098586 A1 | 5/2004 | Rebo et al. | | |
| 2005/0079866 A1 * | 4/2005 | Chen et al. | | 455/435.1 |
| 2005/0124344 A1 * | 6/2005 | Laroia et al. | | 455/436 |
| 2006/0083205 A1 * | 4/2006 | Buddhikot et al. | | 370/338 |
| 2006/0276176 A1 * | 12/2006 | Lee et al. | | 455/411 |
| 2007/0099598 A1 * | 5/2007 | Voyer et al. | | 455/411 |
| 2007/0173259 A1 * | 7/2007 | Akihara | | 455/446 |
| 2012/0178418 A1 * | 7/2012 | Yu | | 455/411 |
| 2012/0184240 A1 * | 7/2012 | Reudink | | 455/405 |

FOREIGN PATENT DOCUMENTS

| | | |
|---|---|---|
| EP | 0 944 274 A2 | 9/1999 |
| EP | 1 124 400 A2 | 8/2001 |
| GB | 2 282 299 A | 3/1995 |

* cited by examiner

*Primary Examiner* — Kamran Afshar
*Assistant Examiner* — Khawar Iqbal
(74) *Attorney, Agent, or Firm* — Oblon, Spivak, McClelland, Maier & Neustadt, L.L.P.

(57) ABSTRACT

The present invention concerns a method for enabling a first base station to be included within a wireless cellular network, the wireless cellular network comprising a server, a plurality of second base stations and a telecommunication network linking the base stations and the server, the base stations managing cells. The first base station transfers a first message comprising at least an identifier of the first base station and information representative of the location of the first base station to the server, receives from the server a second message comprising an identifier of a second base station which manages a cell which is neighbor of a cell of the first base station and a certificate proving that the first base station is authorized to communicate with the second base station, transfers to the second base station a third message comprising the certificate in order to establish a communication with the second base station.

20 Claims, 4 Drawing Sheets

METHOD FOR ENABLING A BASE STATION TO CONNECT TO A WIRELESS TELECOMMUNICATION NETWORK

The present invention relates generally to methods and devices which enable a base station to be included within a wireless cellular network.

Current wireless cellular networks are based on a centralised architecture. A base station controller controls multiple base stations, which in turn aim at covering given cells. When a cellular wireless mobile network operator wishes to add a cell in its network, it usually achieves the following operations. First, it installs the base station on the site and connects it physically to its serving base station controller. Then, it configures the base station controller so that base station controller configures the base station with its operation domain such as the frequency or time slots or codes used for its operation.

In addition, the base station controller handles the handover procedures of mobile terminals from/to newly added cell to/from existing neighbouring cells, so that mobile terminals wandering in an area served by such cells can continue their communications seamlessly while moving from one cell to another.

The base station controller and the base stations belong to the same entity which manages and installs each of the elements which compose the wireless cellular network. Thus, each different elements of the wireless cellular network can trust any information received from the other elements of the wireless cellular network. The problem of current wireless cellular networks is that the entity which establishes such network needs a lot of resources in term of manpower, investments, and maintenance of the elements of the wireless cellular network.

Wireless local area networks like, like, WiFi wireless local area networks are more and more adopted in the small office or home market. The multiplication of such wireless area networks creates some overlapping between the respective covering areas of neighbouring wireless local area networks.

Such overlapping of the covering areas creates a similar situation as the one created by the cells of a classical wireless cellular network.

The overlapping of the covering area of different wireless local area networks handled by different entities reduces the throughput of each of the neighbouring wireless local area networks There is no solution today to solve such problems in a simple and efficient way.

Furthermore, as far as these wireless local area networks belong to different entities, it is difficult, for one entity which manages a wireless local area network to trust information received from unknown wireless local area networks as far as some malicious entities may intend to attack or use the resource of their wireless local area network.

In the state of the art, it is difficult to create some wireless cellular networks, wherein some mobile terminals can use, during a communication with another telecommunication device, the resources of different wireless local area networks belonging to different entities as far as the wireless local area networks don't communicate each other.

The aim of the invention is therefore to propose methods and devices which enable in a simple and efficient way, a base station to be included within a wireless cellular network wherein some elements of the wireless cellular network created by the base stations and the cells they managed may belong to different entities.

Furthermore, the present invention aims to use existing wireless local area networks in order to form a wireless cellular network.

Furthermore, the present invention aims to reduce the problem generated by neighbouring wireless local area networks when they use similar operation domains.

To that end, the present invention concerns a method for enabling a first base station to be included within a wireless cellular network, the wireless cellular network comprising a server, a plurality of second base stations and a telecommunication network linking the base stations and the server, the base stations managing cells, characterised in that the method comprises the steps, executed by the first base station, of:
  transferring a first message comprising at least an identifier of the first base station and information representative of the location of the first base station to the server,
  receiving from the server a second message comprising an identifier of a second base station which manages a cell which is neighbour of a cell of the first base station and a certificate proving that the first base station is authorized to communicate with the second base station which manages the cell which is neighbour of the cell of the first base station,
  transferring to the second base station which manages the cell which is neighbour of the cell of the first base station a third message comprising the certificate in order to establish a communication with the second base station which manages the cell which is neighbour of the cell of the first base station.

The present invention concerns also a device for enabling a first base station to be included within a wireless cellular network, the wireless cellular network comprising a server, a plurality of second base stations and a telecommunication network linking the base stations and the server, the base stations managing cells, characterised in that the device is included in the first base station and comprises:
  means for transferring a first message comprising at least an identifier of the first base station and information representative of the location of the first base station to the server,
  means for receiving from the server a second message comprising an identifier of a second base station which manages a cell which is neighbour of a cell of the first base station and a certificate proving that the first base station is authorized to communicate with the second base station which manages the cell which is neighbour of the cell of the first base station,
  means for transferring to the second base station which manages the cell which is neighbour of the cell of the first base station a third message comprising the certificate in order to establish a communication with the second base station which manages the cell which is neighbour of the cell of the first base station.

Thus, the first base station is aware about the base station which is located in its vicinity. More precisely, the first base station is aware about the other base station which manages a cell which is neighbour of its cell.

Furthermore, the first base station can be included within a wireless cellular network wherein the cells of the wireless cellular network are the cells of a multiplicity of base stations.

According to a particular feature, the second message comprises identifiers of plural second base stations which manages a cell which is neighbour of the cell of the first base station and a certificate proving that the first base station is authorized to communicate with each second base station which manages the cell which is neighbour of the cell of the first base station.

According to a particular feature, the second message comprises identifiers of plural second base stations which manages the cell which is neighbour of the cell of the first base station and comprises for each second base station of which an identifier is comprised in the message, a certificate proving that the first base station is authorized to communicate with the second base station.

Thus, the first base station is aware about the base stations which are located in its vicinity. More precisely, the first base station is aware about the other base stations which manage cells which are neighbour of its cell.

According to a particular feature, the first base station establishes a communication between the first and each second base station which manages the cell which is neighbour of the cell of the first base station, receives, through each established communication, from each second base station which manages the cell which is neighbour of the cell of the first base station, at least a fourth message comprising the operation domain of the cell managed by the second base station, determines the operation domain of the cell managed by the first base station according to the received operation domains.

Thus, the first base station, being aware of the operation domains of neighbouring cells, can determine for its cell, the operation domain which reduces as much as possible the interferences with neighbouring cells.

According to a particular feature, once having determined its operation domain, the first base station transfers to each second base station which manages the cell which is neighbour of the cell of the first base station, through the respective established communication, at least a fifth message comprising the operation domain of the cell managed by the first base station.

Thus, the second base station, being aware of the operation domains determined by the first base station, can update the operation domain of the cell it manages.

According to a particular feature, the first message further comprises a signature which enables an authentication of the first base station and/or the second message is encrypted by the public encryption key of the first base station or encrypted using a common encryption key shared by the first base station and the server and/or the third message further comprises the public key of the first base station 10 and/or a signature obtained by encoding the identifier of the first base station with the private key of the first base station, and/or the third message is encrypted with the public key of the base station the message is sent.

Thus, the transfer of messages within the telecommunication network is safe. Furthermore, a classical telecommunication network used by other parties for other purpose can be used in the present invention. If any other party tries maliciously to disturb the base stations or the server by sending messages, such messages will not be treated by the base stations and/or the server.

According to another particular feature, the first base station receives from each second base station which manages the cell which is neighbour of the cell of the first base station, at least a sixth message comprising information related to a communication context of at least a mobile terminal served by the second base station, transfers to at least a second base station through the established communication between the first and the second base station which manages the cell which is neighbour of the cell of the first base station, a seventh message comprising the information related to a communication context of a mobile terminal served by the first base station.

Thus, the first base station can tune its radio so as to deal with the communication context. The communication of the one mobile terminal can handover between cells served by different base stations of different entities without interruption.

Furthermore, the first base station can handover a communication of one mobile terminal to a second base station. The load of the first base station can be minimised in case of congestion, and the communication of the mobile terminal can continue without interruption when it leaves the coverage area of a cell controlled by the first base station.

According to another particular feature, the established communication is a logical or a physical secured connection.

Thus the established communication is secured.

The present invention concerns also a method for enabling a first base station to be included within a wireless cellular network, the wireless cellular network comprising a server, a plurality of second base stations and a telecommunication network linking the base stations and the server, the base stations managing cells, characterised in that the method comprises the steps executed by the server of:
- receiving a message comprising at least an identifier of the first base station and information representative of the location of the first base station,
- determining a second base station which manages a cell which is neighbour of a cell of the first base station,
- transferring to the first base station an identifier of the determined second base station and a certificate which proves that the first base station is authorized to communicate with the determined second base station.

The present invention concerns also a device for enabling a first base station to be included within a wireless cellular network, the wireless cellular network comprising a server, a plurality of second base stations and a telecommunication network linking the base stations and the server, the base stations managing cells, characterised in that the device is included in the server and comprises:
- means for receiving a message comprising at least an identifier of the first base station and information representative of the location of the first base station,
- means for determining a second base station which manages a cell which is neighbour of a cell of the first base station,
- means for transferring to the first base station an identifier of the determined second base station and a certificate which proves that the first base station is authorized to communicate with the determined second base station.

Thus, the server can inform the first base station about the base station which is located in its vicinity. More precisely, the first base station is aware about the other base station which manages a cell which is neighbour of its cell.

Furthermore, the first base station can be included within a wireless cellular network wherein the cells of the wireless cellular network are the cells of different base stations.

According to a particular feature, prior to determining the second base station which manages the cell which is neighbour of the cell of the first base station, the method comprises the step of authenticating the first base station from the content of the received message.

Thus, the server transfers messages to only an authorized base station and then avoids some malicious attacks.

According to a particular feature, the certificate comprises the identifier of the first base station, the identifier of the second base station of which the first base station is authorized to communicate and a signature obtained by encoding the identifiers with the private key of the server or the certificate comprises the identifier of the first base station, the identifier of the second base station of which the first base station is authorized to communicate, a timestamp and a signature obtained by encoding the identifiers and the time stamp with the private key of the server.

Thus, authorised base stations can establish authorised connections with other authorised base station within the telecommunication network, and these connections can be used for safe transfer of messages between base stations. Furthermore, a classical telecommunication network used by other parties for other purpose can be used in the present invention. If any other party tries maliciously to disturb the base stations or the server by sending them some messages, such messages will not be treated by the base stations and the server.

The present invention concerns also a method for enabling a first base station to be included within a wireless cellular network, the wireless cellular network comprising a server, a plurality of second base stations and a telecommunication network linking the base stations and the server, the base stations managing cells, characterised in that the method comprises the steps executed by a second base station:
  receiving a message comprising a certificate from the first base station,
  checking if the certificate is representative of an authorisation enabling the first base station to communicate with the second base station,
  establishing a communication with the first base station if the certificate is representative of an authorisation enabling the first base station to communicate with the second base station.

The present invention concerns also a device for enabling a first base station to be included within a wireless cellular network, the wireless cellular network comprising a server, a plurality of second base stations and a telecommunication network linking the base stations and the server, the base stations managing cells, characterised in that the device is included in a second base station and comprises:
  means for receiving a message comprising a certificate from the first base station,
  means for checking if the certificate is representative of an authorisation enabling the first base station to communicate with the second base station,
  means for establishing a communication with the first base station if the certificate is representative of an authorisation enabling the first base station to communicate with the second base station.

Thus, the first base station can be included within a wireless cellular network wherein the cells of the wireless cellular network are the cells of different base stations.

Furthermore, the second base station can prevent malicious attacks and communicate only with the base stations authorized by the server.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the method and device according to the invention, they will not be repeated here.

The characteristics of the invention will emerge more clearly from a reading of the following description of an example embodiment, the said description being produced with reference to the accompanying drawings, among which.

Figure 1:
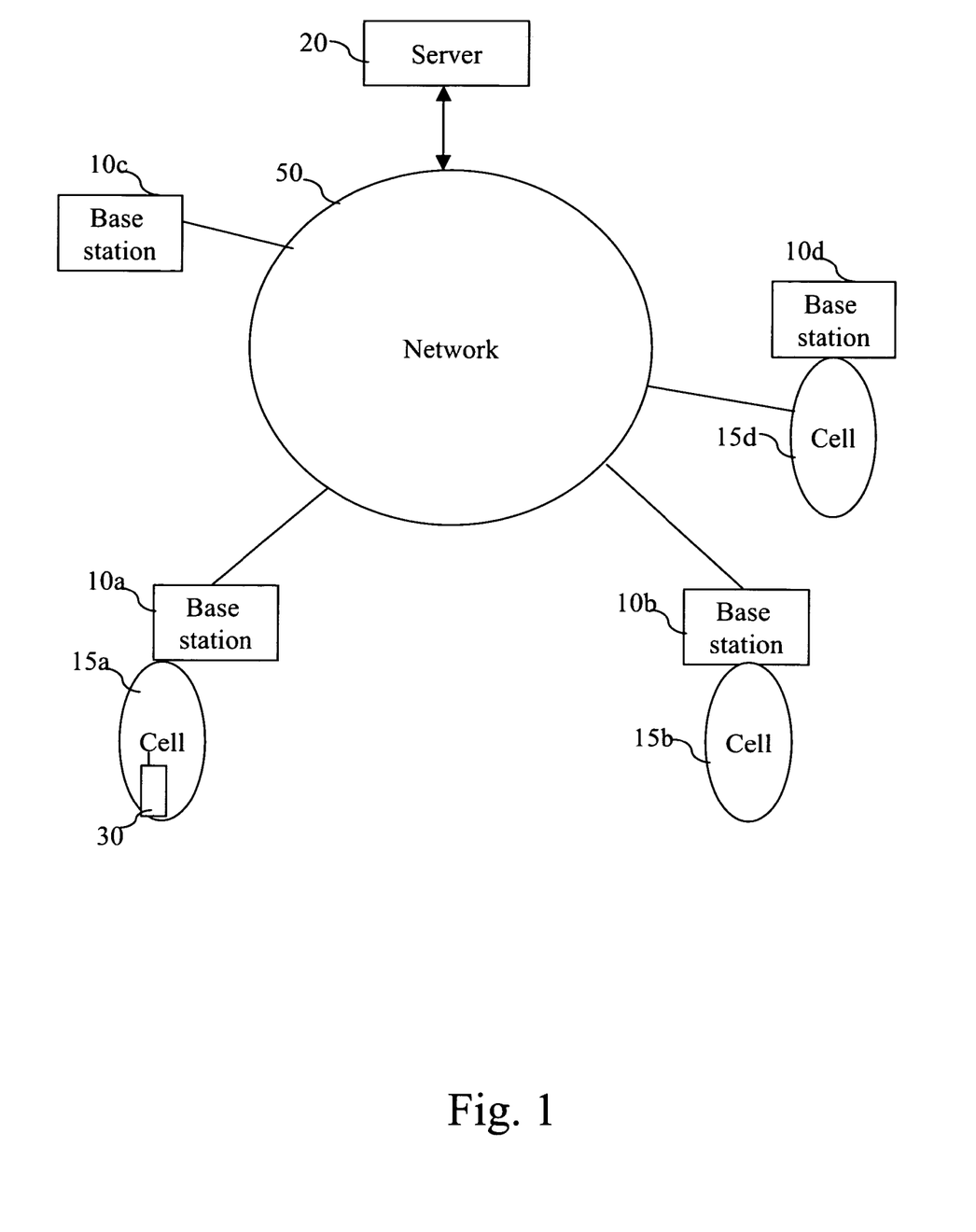
FIG. 1 is a diagram representing the architecture of the wireless cellular network according to the present invention.

In the wireless cellular network of the FIG. 1, several base stations 10a, 10b, 10c and 10d are linked each other through a telecommunication network 50. The base stations 10a to 10d access through the same telecommunication network 50 to services provided by a server 20.

The base stations 10a to 10d belong to the same entity or belong to different entities. The base stations 10a to 10d are, as example, the base stations of a classical wireless cellular network which enables mobile terminals 30 like mobile phones, PDA, or portable computers, to communicate with other remote telecommunication devices. The base stations are, in another example of realisation, the base stations or in other words, the access points of different wireless local area networks, like Wifi wireless local area networks, which belong to different entities.

Each base station 10a to 10d is in charge of at least one cell 15 wherein mobile terminals 30, which are located within that cell 15, can detect a pilot signal and establish or receive some communications through the base stations 10 which manages the cells 15.

In the FIG. 1, only one cell 15a, 15b and 15d is shown respectively for each of the base stations 10a, 10b and 10d, but we can understand that a more important number of cells are managed by a base station 10 in the present invention.

A cell 15 may be defined as a set of geographical locations to which a given base station 10 provides the best quality of received pilot signals by the mobile terminals 30 comprised in that cell 15 among pilot signals of other neighbouring cells 15.

For the sake of simplicity, the cell managed by the base station 10c is not shown in the FIG. 1.

In the FIG. 1, only four base stations 10a to 10d are shown, but we can understand that a more important number of base stations 10 can be used in the present invention. On a similar way, only one server 20 is shown, but we can understand that a more important number of servers can be used in the present invention.

The server 20 stores information about all the base stations 10a to 10d which are linked to the telecommunication network 50. These information are information representative of the geographical location of the different base stations 10a to 10d, the unique identifier of each of the base station 10 set during the manufacture of the base station 10, or a secret number or an authentication key, or a password defined when the base stations 10 are manufactured. With the information representative of the geographical location, the server 20 is able to determine which given base station 10 of the base stations 10a to 10d is geographically neighbour to a given base station 10.

The server 20 memorizes information which enables it to determine the neighbouring cells 15 of a cell 15 of a newly added base station 10. Such information are, as example, defined according to radio network planning techniques.

The telecommunication network 50 is a dedicated wired network or a public network like a public switched network or an IP based network or an Asynchronous Transfer mode network or a wireless network or a combination of above cited networks.

The telecommunication network 50 connects the base stations 10 and the server 20 together and allows the transfer of messages between the base stations 10 and between each base station 10 and the server 20 according to the present invention.

The general principle of the present invention is that the wireless telecommunication network is built from interconnected base stations 10, which can individually serve one or multiple cells 15. When a new base station 10, as example the base station 10b is added to the wireless telecommunication network, such base station 10b connects itself to the server 20 and declares itself and transfers information representative of its location to the server 20.

The server 20 authenticates the base station 10b, determines from the information representative of the location of the base station 10b, the neighbouring cells 15 of the cell 15b of the base station 10b, and transfers a list comprising an identifier of each base station 10 which manages a neighbouring cell 15 of the cell 15b. According to the invention, the server 20 further transfers to the base station 10b, for each base station 10 which manages a neighbour cell 15 of the cell 15b, a neighbouring certificate.

Then, the base station 10b establishes a communication with these base stations 10a and 10d.

According to the present invention, a communication is established when the base station 10b has transferred a message comprising the neighbouring certificate to a base station 10 which manages a neighbour cell 15 of the cell 15b and when the base station 10 which manages a neighbour cell 15 of the cell 15b determines that the base station 10b is allowed to communicate with it using the neighbouring certificate.

The communication is a classical transfer of message when needed or by establishing a physical or logical connection with these base station 10a and 10d.

More particularly, once an inter-base station 10 communication is ready, the base station 10b receives some information related to the operation domain used by the involved neighbour cell such as frequency, time slot, codes . . . .

From this information, the base station 10b decides on its own, of an acceptable operation domain for its own cell 15b and then informs its neighbouring base stations 10a and 10d that it starts operation of its cell 15b on the selected operation domain. The base stations 10a and 10d then add the new cell 15b in their individual list of broadcasted neighbour cells, so that the mobiles terminals 30 served by their respective cells 15a and 15d can now measure the signals of the newly added cell 15b in order to proceed, if necessary, to classical handover procedure with the newly added cell 15b. On its side, the base station 10b starts to broadcast, for the same reason, the list of neighbour cells 15a and 15b.

Later on, each time a handover is made from a cell 15 of a base station 10 which serves a mobile terminal 30 to a cell 15 of a base station 10 which is expected to serve the mobile terminal 30, the communication context of the mobile terminal 30 is transferred through the established communication from the base station 10 which serves the mobile terminal 30 to the base station 10 which is expected to serve the mobile terminal 30. The communication context comprises communication parameters like a code number, a frequency, a time slot, a data format, communication ports, etc. . . .

Figure 2:
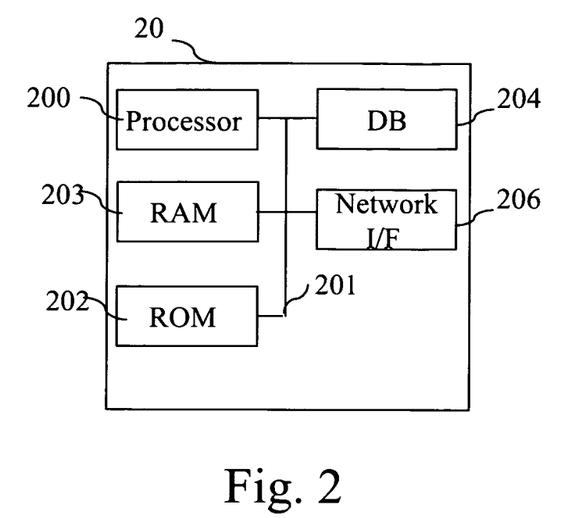
FIG. 2 is a diagram representing the architecture of a server according to the present invention.

FIG. 2 is a diagram representing the architecture of a server according to the present invention.

Figure 5:
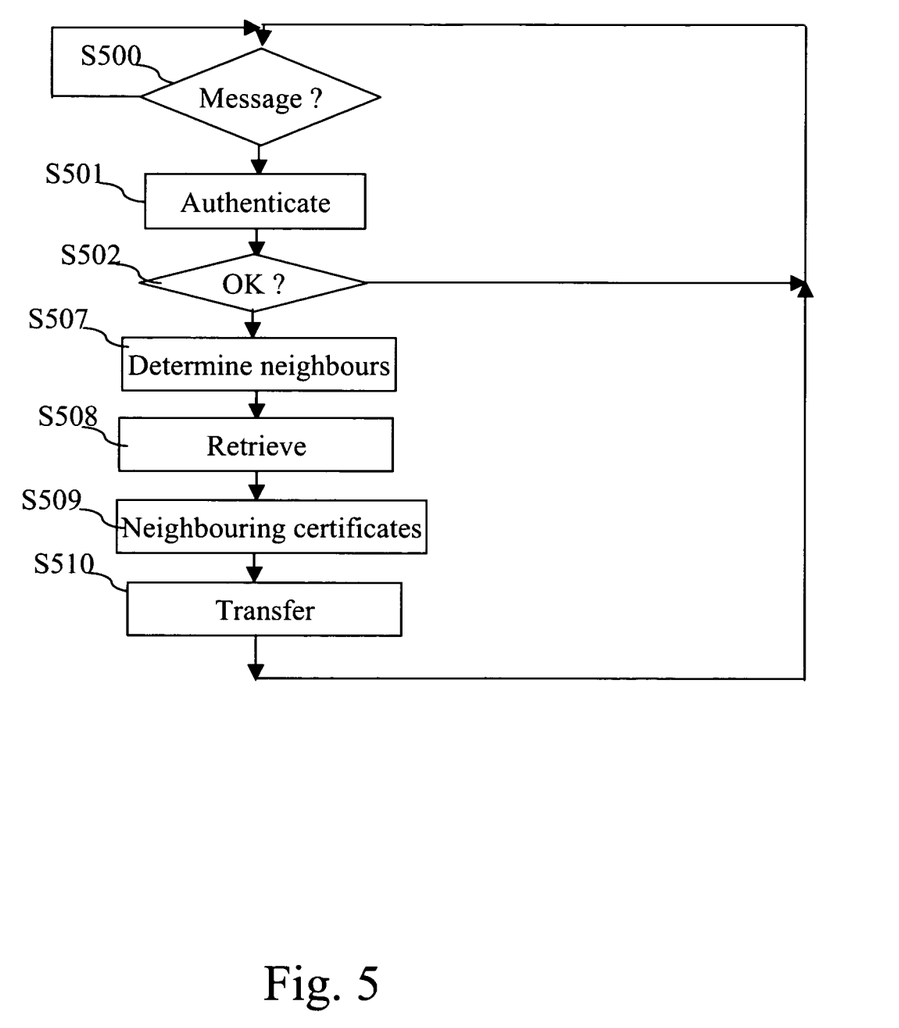
FIG. 5 is an algorithm executed by the server when a base station is installed in the wireless cellular network according to the present invention.

The server 20 has, for example, an architecture based on components connected together by a bus 201 and a processor 200 controlled by programs as disclosed in the FIG. 5.

The bus 201 links the processor 200 to a read only memory ROM 202, a random access memory RAM 203, a telecommunication network interface 206 and a data base 204.

The memory 203 contains registers intended to receive variables and the instructions of the programs related to the algorithm as disclosed in the FIG. 5.

The processor 200 executes the algorithm as disclosed in the FIG. 5.

The read only memory 202 contains instructions of the programs related to the algorithm as disclosed in the FIG. 5 which are transferred, when the server 20 is powered on to the random access memory 203.

The server 20 is connected to the telecommunication network 50 through the network interface 206. As example, the network interface 206 is a DSL (Digital Subscriber Line) modem, or an ISDN (Integrated Services Digital Network) interface, or PLC (Power Line Communication) interface, or a wireless interface, etc. Through such interface, the server 20 transfers information to the base stations 10 as it will be disclosed in reference to the FIG. 5.

The database 204 comprises all information related to the bases stations 10 like information representative of their geographical location, the unique identifier of each of the base station 10, or a secret number or an authentication key, or a password defined when the base stations 10 are manufactured and/or when a base station 10 subscribes to the service provided by the server 20, and the base stations 10 public key. It also contains the public and the private key of the server 20.

Figure 3:
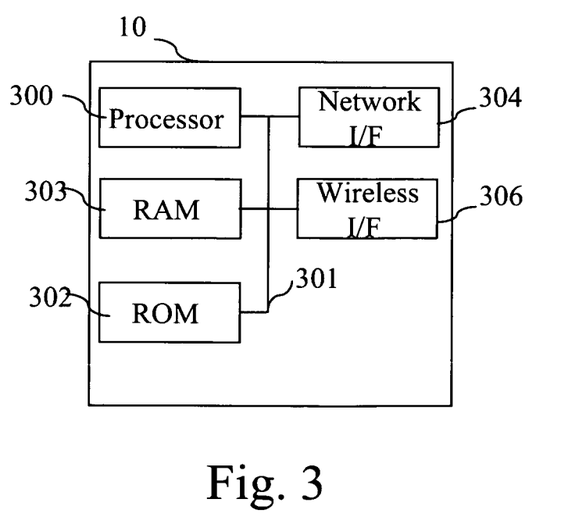
FIG. 3 is a diagram representing the architecture of a base station according to the present invention.

FIG. 3 is a diagram representing the architecture of a base station according to the present invention.

Figures 4, 6:
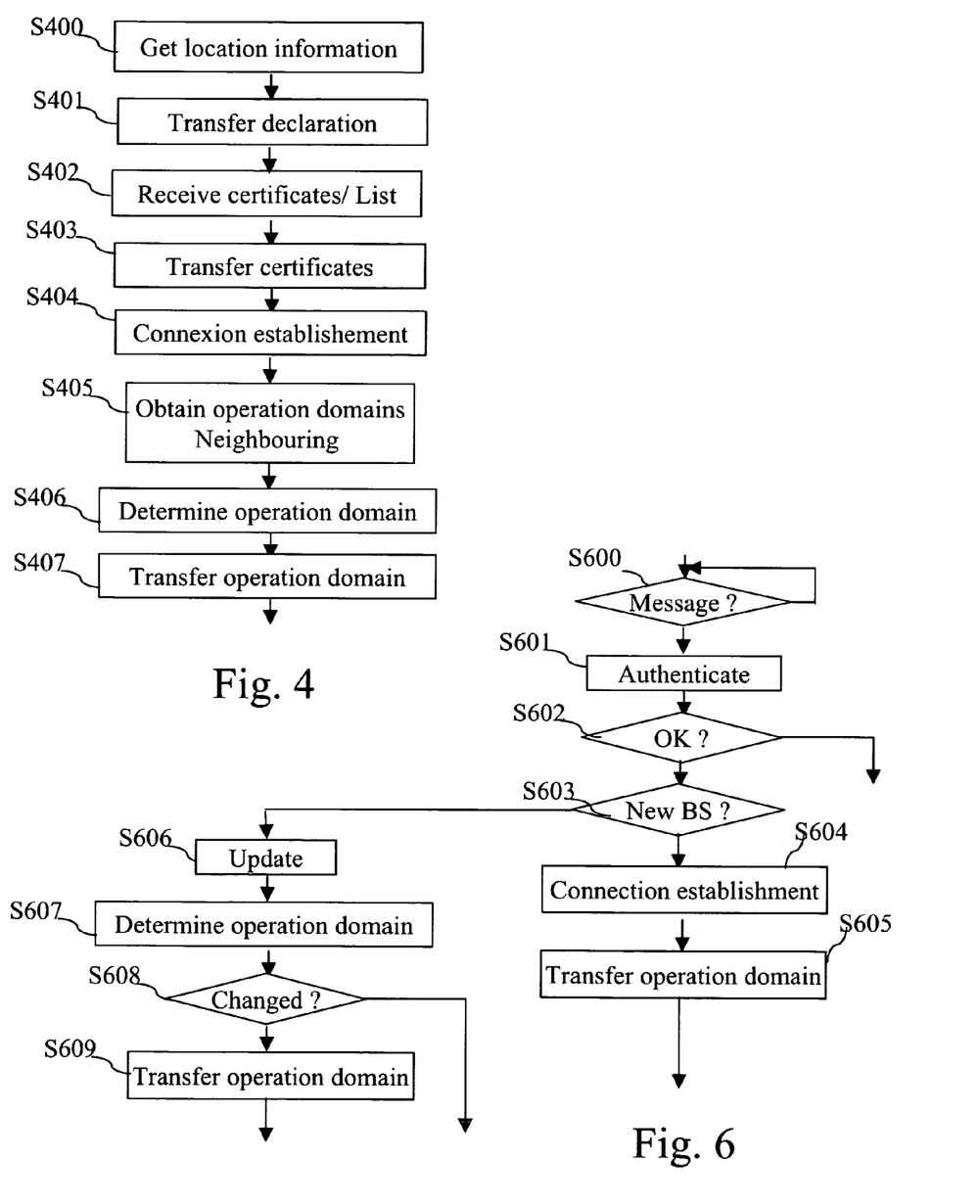
FIG. 4 is an algorithm executed by a base station when it is installed in the wireless cellular network according to the present invention.
FIG. 6 is algorithm executed by a neighbouring base station of a base station installed in the wireless cellular network according to the present invention.

The base station 10 has, for example, an architecture based on components connected together by a bus 301 and a processor 300 controlled by programs as disclosed in the FIGS. 4 and 6.

The base station 10 is, as example and in a non limitative way, a base station 10 of a wireless cellular network, or the base station of a wireless local area network or a set-top box providing wireless local area network functionality.

The bus 301 links the processor 300 to a read only memory ROM 302, a random access memory RAM 303, a network interface 304 and a wireless interface 306.

The memory 303 contains registers intended to receive variables, the list of identifiers of the base stations which manage neighbouring cells 15, the operation domain of each of the neighbouring cells, the communication context of the mobile terminals 30 served by the base station 10 and the instructions of the programs related to the algorithms as disclosed in the FIGS. 4 and 6.

The processor 300 controls the operation of the network interface 304 and the wireless interface 306.

The read only memory 302 contains instructions of the programs related to the algorithms as disclosed in the FIGS. 4 and 6 which are transferred, when the base station 10 is powered on to the random access memory 303.

A base station 10 is connected to the telecommunication network 50 through the network interface 304. As example, the network interface 304 is a DSL (Digital Subscriber Line) modem, or an ISDN (Integrated Services Digital Network) interface, or PLC (Power Line Communication) interface, or a wireless interface, etc. Through such interface, the base station 10 exchanges information which the server 20 and the neighbour base stations 10 which manage neighbouring cells.

The wireless interface 306 allows to communicate with the mobile terminals 30 which are in the cell 15 of the base station 10. The wireless interface 306 contains one radio antenna or multiple radio antennas, each radio antenna serving a given cell 15 of the base station 10.

FIG. 4 is an algorithm executed by a base station when it is installed in the wireless cellular network according to the present invention.

Such algorithm is, as example, executed by the processor 300 of a base station 10 when it is installed and connected to the telecommunication network 50 or when it is powered on or when it is moved from one location to another one.

At step S400, the processor 300 obtains information representative of the location of the base station 10. Such information is obtained, as example an in a non limitative way, from the person who installs the base station 10 through a man machine interface not shown in the FIG. 3 or through a Global Positioning System (GPS) device included within the base station 10 or connected to it. As example and in a non limitative way, the information representative of the location of the base station 10 is the post address of the building wherein the base station 10 is located, the phone number allocated to a telephone line within the building wherein the base station 10 is located or any other network address which permits to retrieve the post address of the building wherein the base station 10b is located, or the GPS coordinates of the base station 10 or the latitude, longitude and altitude of the position of the base station 10.

The information representative of the location of the base station 10 can be also the amplitude of signals and identifiers of base stations 10 comprised in that signals, which are transmitted by some base stations 10 in their respective cells 15 and received by the base station 10 or by a device connected to the base station 10.

At step S401, the processor 300 commands the transfer of a registration message to the server 20. The registration message comprises the information representative of the location of the base station 10 previously obtained, the telecommunication network address of the base station 10. The registration message comprises information enabling the authentication of the base station 10b by the server 20. Such information enabling the authentication of the base station 10b is, as example, a signature and the base station 10b public encryption key. The signature is obtained by encoding the base station identifier with the base station 10b private key, according to RSA asymmetric certification scheme. The information enabling the authentication of the base station 10b is, in a variant of realization of the present invention ciphered, with the public encryption key of the server 20 and contains a secret number or an authentication key, a password memorized in the ROM memory 302 of the base station 10b and known by the server 20. The certificate, in another variant of realization of the present invention, also contains a validity timestamp.

At next step S402, the processor 300 receives a response message from the server 20 through the telecommunication network 50. The response message comprises the list of the base stations 10 which manage the neighbouring cells determined by the server 20. The list of base stations 10 comprises the addresses, within the telecommunication network 50, of the base stations 10 which manage the neighbouring cell 15 of the cell 15b of the base station 10b. According to the example of the FIG. 1 the list comprises the addresses of the base station 10a and 10d. The response message is encrypted with the public encryption key of the base station 10b or encrypted using a common encryption key shared by all the base stations 10 and the server 20. The encrypted response message comprises, for each base station 10 which manage a neighbouring cell 15 of a cell 15b of the base station 10b, a certificate which proves that the base station 10b is allowed by the server 20 to communicate with the base station 10 which manages the neighbouring cell 15 of the cell 15b of the base station 10b.

In a variant of realisation, the encrypted response message comprises one certificate which proves that the base station 10b is allowed by the server 20 to communicate with all base stations 10 which manage the neighbouring cells 15 of the cell 15b of the base station 10b.

Such certificates are called neighbouring certificates.

In another preferred mode of realisation, the response message also includes the public encryption key of each of the base stations 10a and 10d which manage the neighbouring cells 15a and 15d of the cell 15b base station 10b.

The processor 300 memorizes all these information in the RAM memory 303.

At next step S403, the processor 300 transfers to the base station 10a, the neighbouring certificate obtained at step S402 which proves that the base station 10b is allowed by the server 20 to communicate with the base station 10a and transfers to the base station 10d the neighbouring certificate obtained at step S402 which proves that the base station 10b is allowed by the server 20 to communicate with the base stations 10d.

In a variant of realization, the base stations 10a and 10d transfer a message to the server 20 requesting it to confirm the right given to the base station 10b to access to the wireless cellular network.

Preferably, the information transferred from the base station 10b to the base station 10a and 10d further comprises the public key of the base station 10b. The message further comprises a signature obtained by encoding the identifier of the first base station with the private key of the base station 10b.

In a variant of realisation of the invention, the information transferred from the base station 10b to the base station 10a is encrypted with the public key of the base station 10a, as previously stored in RAM at step S402 and the information transferred from the base station 10b to the base station 10d is encrypted with the public key of the base station 10d, as previously stored in RAM at step S402.

At next step S404, the processor 300 establishes a communication with at least some of the base stations 10 which are comprised in the list of neighbouring base stations 10.

Preferably, the processor 300 establishes a physical or logical connection with each of the base stations 10 which manage a neighbouring cell 15 of the cell 15b base station 10b.

The connection can be, as example and in a non limitative way, compatible with the TCP (Transmission Control Protocol) or the UDP (User Datagram Protocol) protocol, to be used on top of IP signalling.

So, when the base station 10b establishes a bi-directional signalling connection with another base station 10, as example the base station 10a, it sends its messages together with its IP address, the IP address of the base station 10a. Similarly, the base station 10a addresses the base station 10b with the IP address of the base station 10b.

In a preferred mode of realisation of the invention, the bi-directional signalling connection is secured by using a common shared symmetric encryption key for the transfer of messages transferred with UDP/TCP protocol. The common shared symmetric encryption key is negotiated in advance under the protection of the asymmetric ciphering system, where all messages used during the negotiation are encrypted with the public key of the receiver and decrypted with the private key of the receiver.

At step S405, the processor 300 obtains the operation domain of each cell 15a and 15d managed by its neighbouring base stations 10a and 10d through the respective established connections Co1 and Co2.

The operation domain of a cell 15 managed by a base station 10 comprises as example, and in a non limitative way the frequencies used by the base station 10 in its cell 15 and/or the time slots used by the base station 10 in its cell 15 and/or the codes used by the base station 10 in its cell 15.

Each neighbouring base station 10 transfers through the established communication with the base station 10b, the operation domain of its cell 15. Each operation domain is encrypted, using the public encryption key of the base station 10b or using a common shared symmetric encryption key.

At step S406, the processor 300 determines the operation domain of its cell 15b.

For that, the processor 300 builds an occurrence table of usage of the operation domains it has received at step S404. When the base station 10b controls more than one cell 15b, the table also includes the operation domain of its cells 15b.

The processor 300 selects for its cell 15b the operation domain among those of smallest occurrence observed among the cells of its neighbouring base stations 10. Each time an operation domain is chosen for one cell 15b, the table of usage of the operation domains is updated. Then, the operation domain of subsequent cells 15b is selected among those of smallest occurrence and not yet being selected for other cells 15b.

Preferably, the processor 300 selects for its cell 15b the operation domain among those of smallest occurrence observed among the cells 15 of its neighbouring base stations 10 that are neighbour to cell 15b.

In another yet preferred embodiment, the probability of selection of an operation domain of a neighbouring cell 15a of the cell 15b is a decaying function of the monitored information quantifying the neighbourhood relationship between all cells 15a which share the same operation domain and the cell 15b, that is collected in step S407.

At next step S407, the processor 300 transfers the operation domains of the cell 15b back to its neighbouring base stations 10a and 10d, so that they can maintain their own occurrence table of usage of the operation domain. Preferably, each transferred operation domain is encrypted using the public encryption key of the destination base station 10 or using a common shared symmetric encryption key.

FIG. 5 is an algorithm executed by the server when a base station is installed in the wireless cellular network according to the present invention.

The present algorithm is executed by the processor 200 of the server 20.

At step S500, the processor 200 checks whether or not a message is received from the network interface 206. As far as no message is received, the processor 200 executes the loop constituted by the step S500.

If a message is received from the network interface 206, the processor 200 stores the contents of the message in RAM 203 and moves to step S501.

At that step, the processor 200 authenticates the base station 10 which sent the message. For that the processor 200 reads from RAM 203 the contents of the message and decodes the signature comprised in the message in order to get the unique identifier of the base station 10 or decrypts the message using a secret number or an authentication key, or a password. The processor 200 consults the database 204 in order to know if one of these information is registered in the database 204.

At next step S502, the processor 200 decides if the base station 10 is authorized to access to the server 20 according to the database 204 consultation result.

If the base station 10 is not authorized to access the server 20, the processor 200 returns to step S500, stops the process of that message and waits for the reception of a new message to be processed.

If the base station 10 is authorized to access to the server 20, the processor 200 moves to step S507.

At step S507, the processor 200 determines, according to a criterion, the neighbouring base stations 10 of the base station 10 which sent the message. As example, the base station 10b, which is newly installed sent the message.

The criterion, is preferably the distance between base stations geographical location.

From information representative of the geographical location of the base station 10b which was comprised in the received message, that was stored in RAM 203 at step S500, the processor 200 consults the database 204 and determines the set of base stations 10 that manage neighbouring cells of the cell 15b, i.e. that are in the vicinity of that location, with a predetermined distance criterion or a distance criterion chosen so as to find a given number of neighbouring base stations 10. As example the cells 15a and 15d are neighbour of the cell 15b.

If the information representative of the location of the base station 10b which sent the message is the post address of the building wherein the base station 10b is located, the processor 200 determines from the post address, the latitude, longitude and altitude of the base station 10 and determines the set of base stations 10 that are neighbours of that location.

If the information representative of the location of the base station 10b which sent the message is the phone number allocated to a telephone line within the building wherein the base station 10b is located, the processor 200 determines from the phone number, a post address, and then the latitude, longitude and altitude of the base station 10b and determines the set of base stations 10 that are in the vicinity of that location.

If the information representative of the location of the base station 10b which sent the message are the GPS coordinates of the base station 10b or the latitude, longitude and altitude of the position of the base station 10b, the processor 200 determines the set of base stations 10 that are in the vicinity of that location.

If the information representative of the location of the base station 10b are the amplitude of the signals and identifiers measured by the base station 10 which sent the message, the processor 200 determines from such identified signals an estimation of the latitude, longitude and altitude of the base station 10 and determines the set of base stations 10 that are neighbour to that estimated location.

At next step S508, the processor 200 retrieves from the database 204, for each base station 10a and 10d which is in the vicinity of the base station 10b which sent the message, its address within the telecommunication network 50. The processor 200 then adds in the database 204, the information representative of the geographical location of the base station 10b, which was comprised in the received message, the determined list of base stations 10 which manage neighbouring cells, with their address.

At next step S509, for each determined base station 10a and 10d, the processor 200 generates a neighbouring certificate and adds the neighbouring certificate in the list.

A neighbouring certificate contains the identifier or address of base station 10b which sent the message, the identifier or address of the destination base station 10. Preferably, each neighbouring certificate also contains also a validity timestamp. These identifiers and the timestamp are encoded with the private key of the server 20 in order to form a signature of the server 20. Such certificate proves that the base station 10*b* which sent the message is allowed by server 20, to communicate with the destination base station 10 whose address is also contained in the neighbouring certificate.

In a variant realisation of the invention, the neighbouring certificate also contains the identifiers or addresses of all base stations 10 identified at step S508 as neighbour base stations of base station 10*b*.

In a preferred mode of realization, the response message is further encrypted by the public encryption key of the base station 10*b* which sent the message or encrypted using a common encryption key shared by all the base stations 10 and the server 20.

At next step S510, the processor 200 commands the transfer through the telecommunication network 50, to the base station 10*b* which sent the message, of a response message which comprises the list of base stations 10 which manage neighbouring cells and the neighbouring certificates. In a variant of realization, the list and the neighbouring certificates are transferred in different messages.

In another variant of realisation, if the neighbouring certificate contains the identifiers or addresses of all base stations 10 identified at step S508 as neighbouring base stations of the base station 10*b*, the neighbouring certificate is contained only once in the response message.

Once the message is transferred, the processor 200 returns to the step S500 and waits the reception of a new message to be processed.

FIG. 6 is algorithm executed by a neighbouring base station of a base station installed in the wireless cellular network according to the present invention.

At step S600, the processor 300, as example the processor 300 of the base station 10*a*, checks whether or not a message is received from the network interface 304. As far as no message is received, the processor 300 executes the loop constituted by the step S600.

If a message is received from the network interface 304, as example from the base station 10*b*, the processor 300 stores the message in the RAM 203 and moves to step S601.

At that step, the processor 300 authenticates the base station 10*b* which sent the message. For that, the processor 300 decrypts the received message with the private key of base station 10*a* and/or decodes the signature contained in the message with the public key 10 of base station 10*b* and/or checks if the received message comprises a neighbouring certificate which proves that the base station 10*b* which sent the message is allowed by the server 20 to communicate with it.

In a variant of realization, the processor 300 sends a message to the server 20 in order to get a confirmation of the right given to the base station 10*b* which sent the message to access to the wireless cellular network.

If the server 20 fails to send a confirmation in a predetermined period of time, the processor 300 returns to step S600. Upon reception of confirmation by the server 20 of the access right given to the base station 10*b* which sent the message to access to the wireless cellular network, the processor 300 moves to step S602.

At next step S602, the processor 300 decides whether or not it has to process the received message. If the message doesn't comprises a neighbouring certificate which proves that the base station 10 which sent the message is authorized by the server 20 to access the wireless cellular network, the processor 300 stops the process of the message, returns to step S600 and waits for the reception of a new message.

Furthermore, the processor 300 decodes the signature comprised in the certificate using the public key of the server 20. The processor 300 checks if the decoded information are compatible with the identifiers and the timestamp comprised in the message and checks if one identifier is identical to its identifier and the other one identifier is identical to the identifier of the base station which sent the message.

In a variant, the processor 300 checks if whether or not the timestamp contained in the neighbouring certificate is also valid.

If above mentioned checks are successful, the processor 300 moves to step S603 to check whether or not the base station 10*b* which sent the message is known or not by the processor 300. For that, the processor 300 checks whether it has already received information related to operation domain of the base station 10*b* which sent the message.

If the base station 10 which sent the message is known, the processor 300 moves to step S606. On the contrary, the processor 300 moves to step S604.

At the step S604, the processor 300 proceeds to a connection establishment in response to the one as disclosed at step S404 of the FIG. 4.

In a preferred realisation of the invention, the bi-directional signalling connection established with the base station 10 which sent the message is secured by using a common shared symmetric encryption key for the transfer of messages transferred with UDP/TCP protocol. The common shared symmetric encryption key is negotiated with the base station 10 which sent the message under the protection of the asymmetric ciphering system, where all messages used during the negotiation are encrypted with the private key of the transmitter and decrypted with the public key of the transmitter.

At next step S605, the processor 300 transfers the operation domain or domains of its cell or cells 15 to the base station 10*b* which sent the message. Preferably, the transferred operation domains are encrypted using the public encryption key of the destination base station 10*b*, that was contained in the received message stored in RAM at step S600, or with a common shared symmetric encryption key.

Then processor 300 then returns to step S600.

If the base station 10*b* which sent the message is known, the message stored in the RAM 203 at step S600 comprises the operation domain of the cell 15*b* or cells of the base station 10*b* which sent the message. The processor 300 moves from step S603 to step S606 and updates its occurrence table of usage of the operation domains of the cells of its neighbouring base stations 10.

After that, the processor 300 moves to step S607, memorises a copy of its operation domain in RAM memory 303 and determines its operation domain similarly to the determination of operation domain executed at step S406 of the FIG. 4.

In a variant implementation, the determination of operation domain is only executed upon realisation of an additional criterion, e.g. upon, expiration of a timer, of after N successive received such messages. If the additional criterion is not met, the operation domain is kept unchanged.

Then the processor 300 moves to step S608.

At step S608, the processor compares the operation domain determined at step S607 with the operation domain memorised in the RAM memory 303. If both operation domains are equal, the processor returns to step S600. Else, the processor moves to step S609.

At step S609, the processor 300 transfers the operation domain or domains of its cell or cells 15 to all its neighbouring base stations 10*b* and 10*d*, so that they can maintain their own occurrence table of usage of the operation domain. Preferably, the transferred operation domains are encrypted using the public encryption key of the destination base station 10b, or using a common shared symmetric encryption key.

Naturally, many modifications can be made to the embodiments of the invention described above without departing from the scope of the present invention.

The invention claimed is:

1. A method for enabling a first base station to be included within a wireless cellular network, the wireless cellular network comprising a server, a plurality of second base stations and a telecommunication network linking the base stations and the server, the base stations managing cells, the method causing the first base station to perform the steps comprising:
transferring a first message comprising at least an identifier of the first base station and information representative of a location of the first base station to the server;
receiving from the server a second message comprising an identifier of a second base station which manages a cell which is a neighbor of a cell of the first base station and a certificate proving that the first base station is authorized to communicate with the second base station, the certificate including the identifier of the first base station, the identifier of the second base station and a validity timestamp, the first base station belonging to an entity different from an entity to which the second base stations belongs; and
transferring to the second base station a third message comprising the certificate in order to establish a communication with the second base station.

2. The method according to claim 1, wherein the second message comprises identifiers of plural second base stations which manage cells neighboring the cell of the first base station and a certificate proving that the first base station is authorized to communicate with each second base station.

3. The method according to claim 2, further comprising:
establishing a communication between the first and each second base station;
receiving, through each established communication, from each second base station, at least a fourth message comprising the operation domain of the cell managed by each second base station; and
determining the operation domain of the cell managed by the first base station according to the received operation domains from each second base station.

4. The method according to claim 2, wherein the established communication is a logical or a physical secured connection.

5. The method according to claim 1, wherein the second message comprises identifiers of plural second base stations which manage cells neighboring the cell of the first base station and comprises for each second base station of which an identifier is comprised in the message, a certificate proving that the first base station is authorized to communicate with the second base station.

6. The method according to claim 1, wherein the first message further comprises a signature which enables an authentication of the first base station and/or the second message is encrypted by the public encryption key of the first base station or encrypted using a common encryption key shared by the first base station and the server and/or the third message further comprises the public key of the first base station and/or a signature obtained by encoding the identifier of the first base station with the private key of the first base station, and/or the third message is encrypted with the public key of the base station the message is sent.

7. The method according to claim 1, wherein once the operation domain of the cell managed by the first base station is determined, the first base station transfers to each second base station, through the respective established communication, at least a fifth message comprising the determined operation domain by the first base station.

8. The method according to claim 1, further comprising:
receiving from each second base station, at least a sixth message comprising information related to a communication context of at least a mobile terminal served by the second base station; and
transferring to at least a second base station through the established communication between the first and the second base station, a seventh message comprising the information related to a communication context of a mobile terminal served by the first base station.

9. The method according to claim 1, further comprising:
generating a usage list corresponding to the operational domains, the usage list including frequency of use information for each operational domain; and
connecting to a domain having a smallest frequency of use.

10. A method for enabling a first base station to be included within a wireless cellular network, the wireless cellular network comprising a server, a plurality of second base stations and a telecommunication network linking the base stations and the server, the base stations managing cells, the method causing the server to perform the steps comprising:
receiving a message comprising at least an identifier of the first base station and information representative of a location of the first base station;
determining a second base station which manages a cell which is neighbor of a cell of the first base station, the first base station belonging to an entity different from an entity to which the second base stations belongs;
transferring to the first base station an identifier of the determined second base station and a certificate which proves that the first base station is authorized to communicate with the determined second base station, the certificate including the identifier of the first base station, the identifier of the second base station and a validity timestamp.

11. The method according to claim 10, wherein, prior to determining the second base station, the method comprises the step of authenticating the first base station from the content of the received message.

12. The method according to claim 11, wherein the certificate further comprises the identifier of the first base station, the identifier of the second base station of which the first base station is authorized to communicate and a signature obtained by encoding the identifiers with the private key of the server or the certificate comprises the identifier of the first base station, the identifier of the second base station of which the first base station is authorized to communicate, and a signature obtained by encoding the identifiers and the time stamp with the private, key of the server.

13. A method for enabling a first base station to be included within a wireless cellular network, the wireless cellular network comprising a server, a plurality of second base stations and a telecommunication network linking the base stations and the server, the base stations managing cells, the method causing a second base station to perform the steps comprising:
receiving a message comprising a certificate from the first base station, the certificate including an identifier of the first base station, an identifier of the second base station and a validity timestamp, the first base station belonging to an entity different from an entity to which the second base stations belongs;

checking if the certificate is representative of an authorization from the server enabling the first base station to communicate with the second base station; and establishing a communication with the first base station when the certificate is representative of an authorization enabling the first base station to communicate with the second base station.

14. The method according to claim 13, further comprising transferring, through the established communication, the operation domain of the cell that the second base station manages to the first base station.

15. A device for enabling a first base station to be included within a wireless cellular network, the wireless cellular network comprising a server, a plurality of second base stations and a telecommunication network linking the base stations and the server, the base stations managing cells, the device being included in the first base station and comprising:

means for transferring a first message comprising at least an identifier of the first base station and information representative of a location of the first base station to the server;

means for receiving from the server a second message comprising an identifier of a second base station which manages a cell which is neighbor of a cell of the first base station and a certificate proving that the first base station is authorized to communicate with the second base station, the certificate including the identifier of the first base station, the identifier of the second base station and a validity time stamp; and means for transferring to the second base station a third message comprising the certificate in order to establish a communication with the second base station, the first base station belonging to an entity different from an entity to which the second base stations belongs.

16. A device for enabling a first base station to be included within a wireless cellular network, the wireless cellular network comprising a server, a plurality of second base stations and a telecommunication network linking the base stations and the server, the base stations managing cells, the device being included in the server and comprising:

means for receiving a message comprising at least an identifier of the first base station and information representative of a location of the first base station;

means for determining a second base station which manages a cell which is neighbor of a cell of the first base station; and means for transferring to the first base station an identifier of the determined second base station and a certificate which proves that the first base station is authorized to communicate with the determined second base station the certificate including the identifier of the first base station, the identifier of the second base station and a validity timestamp, the first base station belonging to an entity different from an entity to which the second base stations belongs.

17. A device for enabling a first base station to be included within a wireless cellular network, the wireless cellular network comprising a server, a plurality of second base stations and a telecommunication network linking the base stations and the server, the base stations managing cells, the device being included in a second base station and comprising:

means for receiving a message comprising a certificate from the first base station, the certificate including an identifier of the first base station an identifier of the second base station and a validity timestamp;

means for checking if the certificate is representative of an authorization from the server enabling the first base station to communicate with the second base station;

means for establishing a communication with the first base station when the certificate is representative of the authorization enabling the first base station to communicate with the second base station, the first base station belonging to an entity different from an entity to which the second base stations belongs.

18. A non-transitory computer-readable medium storing computer-readable instructions thereon, the computer-readable instructions when executed by a computer cause the computer to execute the method comprising:

transferring a first message comprising at least an identifier of a first base station and information representative of a location of the first base station to a server;

receiving from the server a second message comprising an identifier of a second base station which manages a cell which is a neighbor of a cell of the first base station and a certificate proving that the first base station is authorized to communicate with the second base station, the certificate including the identifier of the first base station, the identifier of the second base station and a validity timestamp;

transferring to the second base station a third message comprising the certificate in order to establish a communication with the second base station, the first base station belonging to an entity different from an entity to which the second base stations belongs.

19. A non-transitory computer-readable medium storing computer-readable instructions thereon, the computer-readable instructions when executed by a computer cause the computer to execute the method comprising:

receiving a message comprising at least an identifier of a first base station and information representative of a location of the first base station;

determining a second base station which manages a cell which is neighbor of a cell of the first base station; and transferring to the first base station an identifier of the determined second base station and a certificate which proves that the first base station is authorized to communicate with the determined second base station, the certificate including the identifier of the first base station, the identifier of the second base station and a validity timestamp, the first base station belonging to an entity different from an entity to which the second base stations belongs.

20. A non-transitory computer-readable medium storing computer-readable instructions thereon, the computer-readable instructions when executed by a computer cause the computer to execute the method comprising:

receiving a message comprising a certificate from a first base station;

checking if the certificate is representative of an authorization from a server enabling the first base station to communicate with a second base station, the certificate including an identifier of the first base station, and identifier of the second base station and a validity timestamp; and establishing a communication with the first base station when the certificate is representative of the authorization enabling the first base station to communicate with the second base station, the first base station belonging to an entity different from an entity to which the second base stations belongs.

* * * * *